US009063450B2

(12) United States Patent
Shoji

(10) Patent No.: US 9,063,450 B2
(45) Date of Patent: Jun. 23, 2015

(54) APPARATUS AND METHOD FOR PERFORMING EXPOSURE ON PHOTORECEPTOR DRUM

(71) Applicant: CANON KABUSHIKI KAISHA, Tokyo (JP)

(72) Inventor: Atsushi Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/325,607

(22) Filed: Jul. 8, 2014

(65) Prior Publication Data

US 2015/0029519 A1 Jan. 29, 2015

(30) Foreign Application Priority Data

Jul. 24, 2013 (JP) ................................ 2013-153803

(51) Int. Cl.

*H04N 1/46* (2006.01)
*H04N 1/60* (2006.01)
*G06K 9/00* (2006.01)
*G03G 15/01* (2006.01)

(52) U.S. Cl.

CPC .................................... *G03G 15/011* (2013.01)

(58) Field of Classification Search

None

See application file for complete search history.

(56) References Cited

U.S. PATENT DOCUMENTS 5,680,230 A * 10/1997 Kaburagi et al. ............. 358/520
5,700,611 A * 12/1997 Regan et al. ............... 430/45.31
5,856,841 A 1/1999 Shinohara et al.
6,057,866 A * 5/2000 Haneda et al. ................ 347/118
6,064,494 A * 5/2000 Hirota et al. .................... 358/1.9
6,198,841 B1 * 3/2001 Toyama et al. ............... 382/164
6,271,930 B1 * 8/2001 Yamazaki .................... 358/1.18
6,608,941 B1 * 8/2003 Suzuki et al. ................. 382/272
6,636,630 B1 * 10/2003 Adachi et al. ................. 382/176
6,920,245 B1 * 7/2005 Hirayama ..................... 382/167
2002/0135790 A1 * 9/2002 Ishiguro ........................ 358/1.9
2003/0035673 A1 * 2/2003 Yamakawa ...................... 400/76
2004/0184104 A1 * 9/2004 Yamamoto et al. ............ 358/2.1
2009/0097874 A1 * 4/2009 Yamamoto ...................... 399/74
2012/0182585 A1 * 7/2012 Kawamura ................... 358/3.03
2012/0195650 A1 * 8/2012 Ogawa et al. ................. 399/301
2012/0229819 A1 * 9/2012 Koyatsu et al. ................ 358/1.1
2012/0250097 A1 * 10/2012 Tanaka ......................... 358/3.24

FOREIGN PATENT DOCUMENTS

JP 09-169136 A 6/1997
JP 2003-312050 A 11/2003

* cited by examiner

*Primary Examiner* — Madelein Nguyen

(74) *Attorney, Agent, or Firm* — Fitzpatrick, Cella, Harper & Scinto

(57) ABSTRACT

In a case where a determination is made that a density of a pixel of interest is greater than a threshold, or in a case where a pixel having a greater density than the threshold is present in a neighborhood of the pixel of interest at a predetermined distance from the pixel of interest, exposure with intensity corresponding to a density of the pixel of interest to which a predetermined density has not been added is performed on a photoreceptor drum at a position corresponding to the pixel of interest. Otherwise, exposure with intensity corresponding to a density of the pixel of interest to which the predetermined density has been added is performed on the photoreceptor drum at the position corresponding to the pixel of interest.

8 Claims, 12 Drawing Sheets

APPARATUS AND METHOD FOR PERFORMING EXPOSURE ON PHOTORECEPTOR DRUM

BACKGROUND OF THE INVENTION

1. Field of the Invention

The present invention relates to an apparatus and a method for performing exposure on a photoreceptor drum.

2. Description of the Related Art

Generally, an electrophotographic image forming apparatus performs a repeated cycle of operations involving charging, latent image formation by lithography, development, transfer, discharging, and cleaning. Also, a color electrophotographic image forming apparatus is provided with a developing unit for each color thereby to perform the above-described cycle of operations. Specifically, the color electrophotographic image forming apparatus having plural developing units performs processing which involves forming an image for a single color by the developing unit, transferring the image (or a toner image) to a transfer body, and conveying the transfer body thereby to convey the toner image to the next developing unit. Here, among the plural developing units, the developing unit which transfers the toner image first is defined as an upstream side of a printing unit, and the developing unit which transfers the toner image thereafter is defined as a downstream side thereof.

A discharging unit to eliminate electric charges remaining on a photoreceptor drum has recently been omitted for the purposes of cost reduction. In a case where the discharging unit is omitted, however, a charged image remaining after the transfer of the image affects the following photoreceptor drum on the downstream side and hence affects a printed result on the downstream side. For example, the toner image formed on a transfer belt by the developing unit on the upstream side may also act as the charged image containing electric charges. The toner image containing the electric charges applies the electric charges to the photoreceptor drum on the downstream side which contacts the transfer belt. The photoreceptor drum on the downstream side is not subjected to the discharging by the discharging unit, and therefore causes a phenomenon called a ghost due to the influence of the toner image containing the electric charges on the upstream side.

There is no approach suitable for suppression of the above-described ghost phenomenon. For example, one possible approach to suppress the ghost phenomenon is to increase a charging voltage at which a charging unit charges the developing unit. The reason is that an increase in the charging voltage to the photoreceptor drum leads to a reduction in relative strength of an electric potential reversely transferred from the transfer belt to the photoreceptor drum. With the charging voltage remaining increased, however, there also arises a problem such as excessive consumption of the toner or scattering of the toner onto an unintended portion. To address this problem, although exposure is performed only on a rendered area for typical image formation, feeble light exposure may be performed also on a non-rendered area other than the rendered area thereby to reduce the charging voltage to its allowable range. Although Japanese Patent Laid-Open Nos. H09-169136 (1997) and 2003-312050 disclose a technology of performing exposure on the non-rendered area, the technology is not for the purpose of suppressing the ghost phenomenon and thus gives no consideration to a problem resulting from the suppression of the ghost phenomenon.

SUMMARY OF THE INVENTION

An apparatus according to the present invention includes a determination unit configured to determine whether a density of each pixel in image data is equal to or less than a threshold; and an adding unit configured to add a predetermined density to a density of each pixel. In a case where a determination is made that a density of a pixel of interest is greater than the threshold, or in a case where a pixel having a greater density than the threshold is present in a neighborhood of the pixel of interest at a predetermined distance from the pixel of interest, exposure with intensity corresponding to a density of the pixel of interest to which the predetermined density has not been added is performed on a photoreceptor drum at a position corresponding to the pixel of interest, otherwise, exposure with intensity corresponding to a density of the pixel of interest to which the predetermined density has been added is performed on the photoreceptor drum at the position corresponding to the pixel of interest.

According to the present invention, an image forming apparatus which outputs a high-quality image can be provided.

Further features of the present invention will become apparent from the following description of exemplary embodiments (with reference to the attached drawings).

DESCRIPTION OF THE EMBODIMENTS

Embodiments for carrying out the present invention will be described below by using the drawings. It is to be understood that the following embodiments are illustrative only and are not intended to limit the scope of the present invention.

Incidentally, before description of specific embodiments, description will firstly be given with regard to a cause of occurrence of the above-described ghost phenomenon, problems caused by measures against the ghost phenomenon, and the like. Then, after description of outlines of the embodiments, the specific embodiments will be described.

[Potential Variations in Electrophotographic Photoreceptor]

Figure 1:
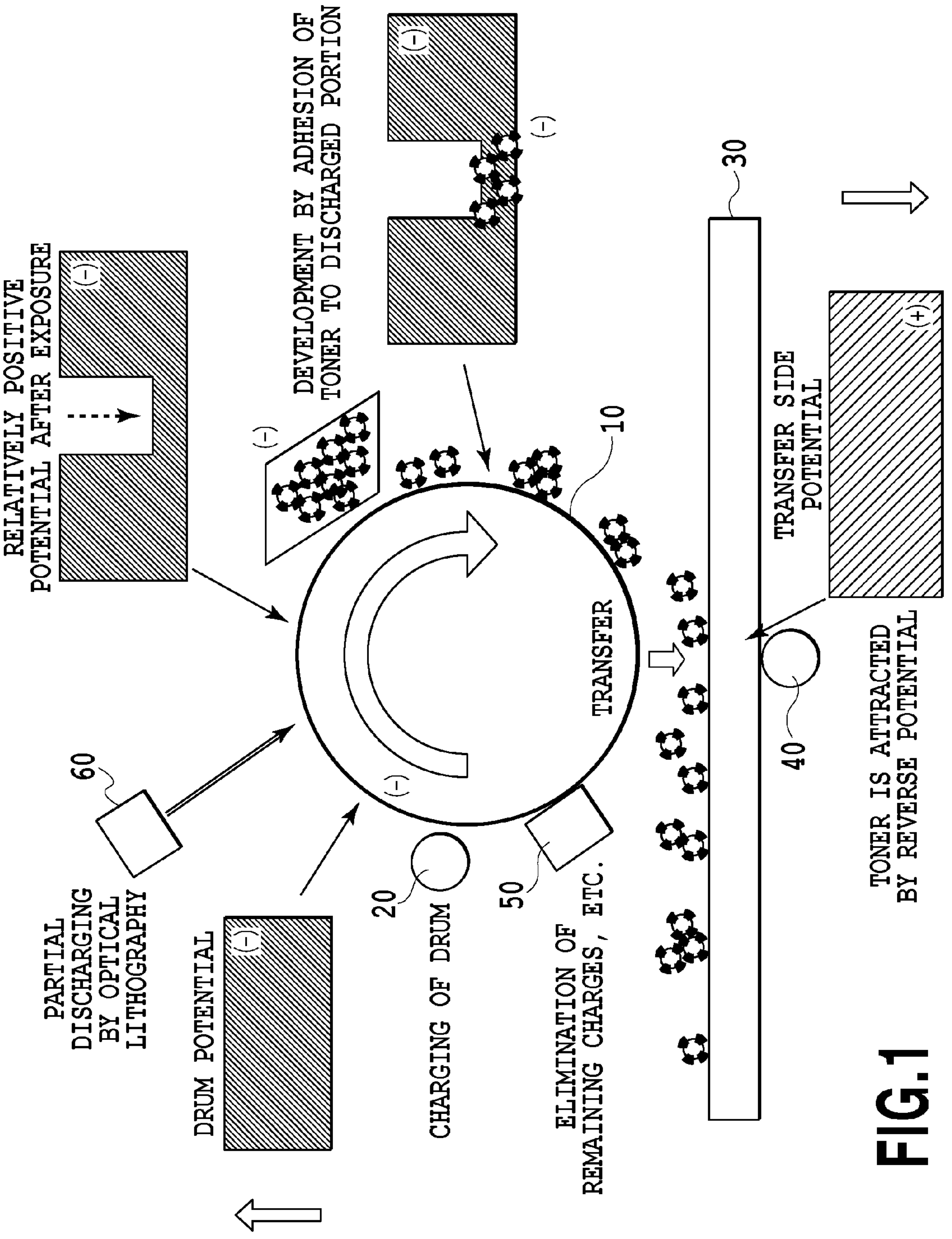
FIG. 1 is a representation illustrating an example of potential variations in an electrophotographic photoreceptor drum.

FIG. 1 is a schematic representation illustrating potential variations in a general electrophotographic photoreceptor. A charging unit 20 charges a photoreceptor drum 10 with a negative potential, and thereby, the potential of the photoreceptor drum 10 becomes negative. Then, a lithography unit 60 lithographs an image on the photoreceptor drum 10 by light. In other words, the lithography unit 60 forms a latent image on the photoreceptor drum 10. The negative potential disappears from an optically lithographed portion of the photoreceptor drum 10, so that this portion bears a relatively positive potential. In other words, the image lithographed portion may be said to be a discharged portion. Toner adheres only to the discharged portion by being brought close to the photoreceptor drum 10 including the discharged portion. In other words, the toner adheres only to the latent image lithographed portion. The photoreceptor drum 10 having the toner adhering thereto is brought into intimate contact with a transfer body 30 and is subjected to a positive reverse potential by a transfer unit 40, and thereby, a toner image is attracted to the transfer body 30. A discharging unit 50 eliminates electric charges remaining on the photoreceptor drum 10.

[Potential Variations in Image Forming Apparatus Having Plural Developing Units]

Figure 2:
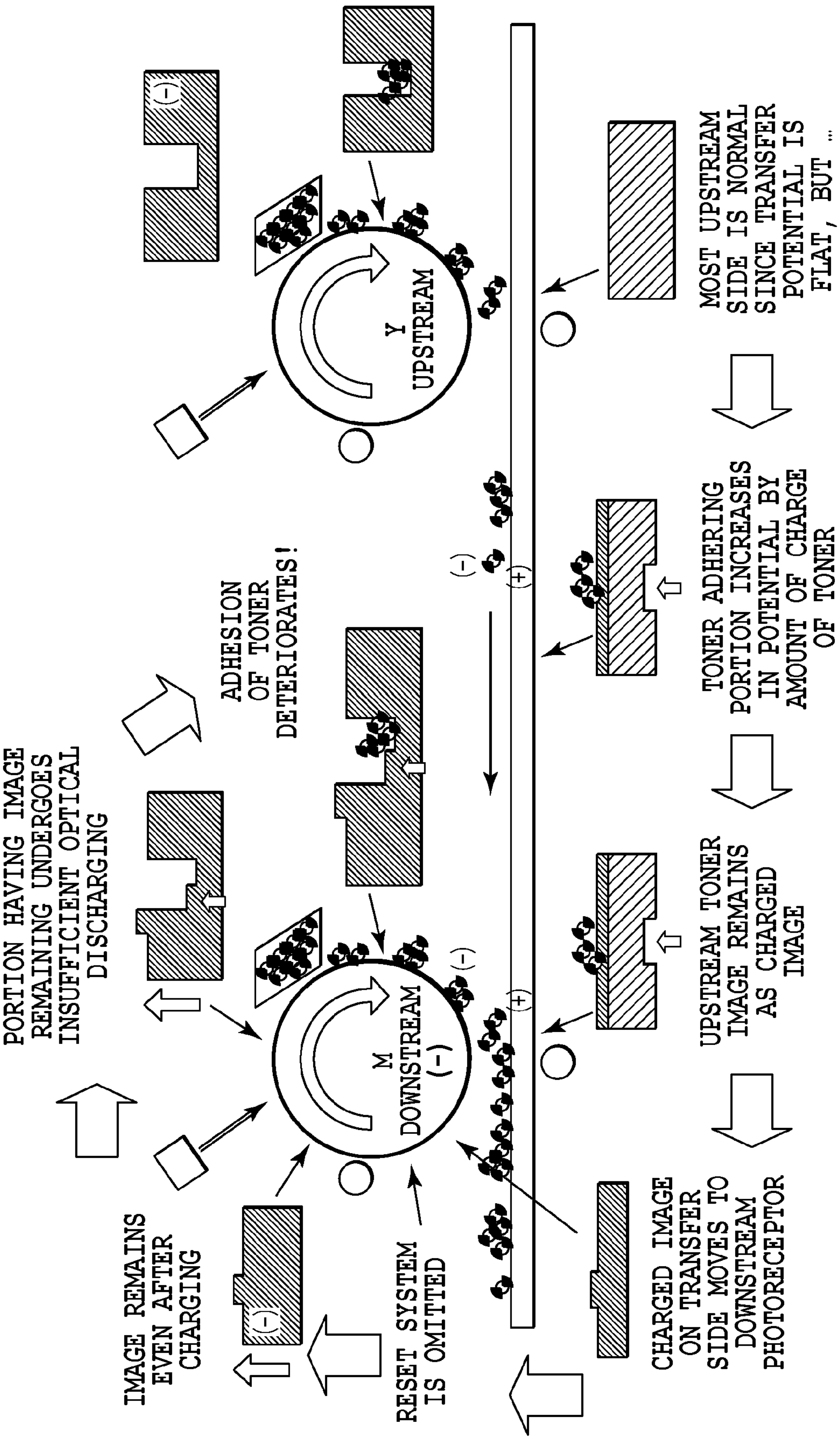
FIG. 2 is a representation illustrating an example of potential variations in an image forming apparatus having plural developing units.

Next, description will be given with regard to an example of potential variations in an image forming apparatus further having plural developing units, with the discharging unit 50 of FIG. 1 omitted. FIG. 2 is a schematic representation illustrating the example of the potential variations in the image forming apparatus having the plural developing units.

Images formed on color electrophotographic photoreceptor drums are sequentially combined together on a transfer belt; however, mutual interference occurs through toner images on the transfer belt and thus causes the occurrence of a ghost. Specific description will be given below.

Description will be given assuming that a developing unit for yellow (Y) is arranged on the upstream side as the side on which the toner image is first carried, and that a developing unit for magenta (M) is arranged on the downstream side. In the developing unit for yellow (Y), a yellow toner image adheres to the transfer belt, as described with reference to FIG. 1. The toner image does not adhere to the transfer belt on the upstream side thereof, and thus, the potential of the transfer belt remains flat. Then, the yellow toner image adheres to the transfer belt, and thereby, a toner adhering portion changes in its potential by the amount of charge of the toner. In other words, the toner image developed on the transfer belt before being fixed on paper is held by the electric charge of the charged toner, and hence the toner image in itself may also be said to be a charged image.

Then, in the developing unit for magenta (M) on the downstream side, the toner image is transferred to the transfer belt, and, at the same time, the charged image formed by the toner image on the transfer belt on the upstream side thereof is reversely transferred to the potential of the photoreceptor drum on the downstream side and thus affects the potential of the photoreceptor drum on the downstream side. In other words, on the photoreceptor drum for magenta (M) on the downstream side, the charged image on the transfer belt moves to the photoreceptor. Thus, in a case where charging is performed by the charging unit on the downstream side, the charged image on the upstream side remains. A portion having the charged image remaining undergoes insufficient discharging during lithographing performed thereafter by the lithography unit, which in turn results in poor adhesion of the toner.

Thus, the reverse transfer of the charged image from the transfer belt to the photoreceptor drum exerts an influence called the ghost upon different colors.

Figure 3:
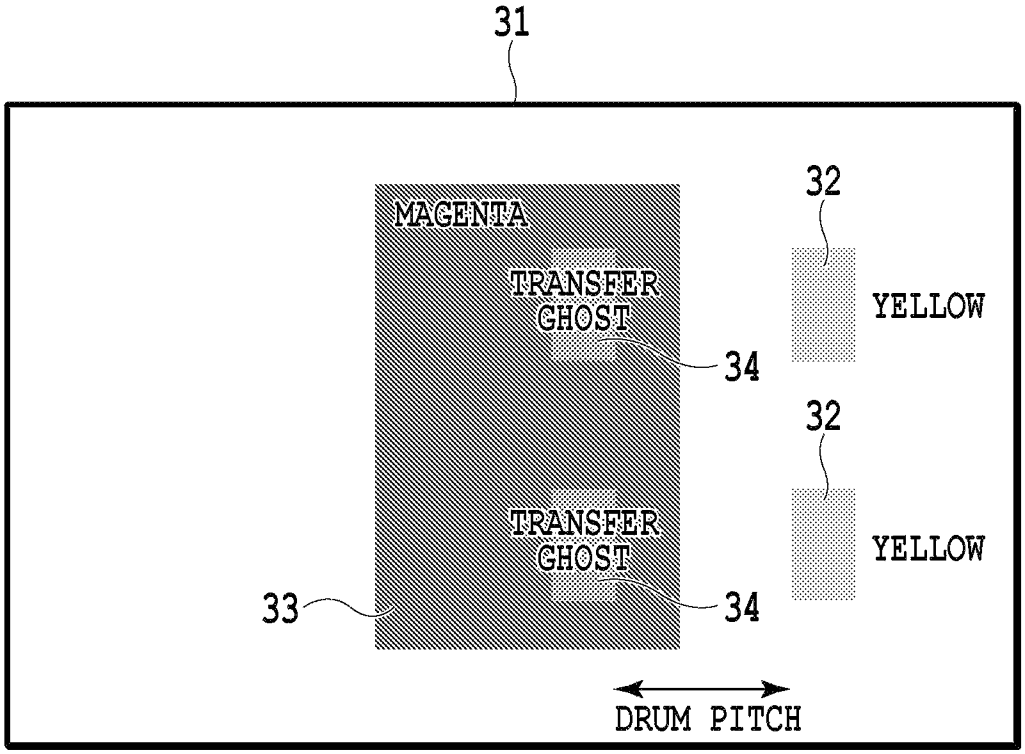
FIG. 3 is a view of assistance in explaining a ghost phenomenon.

FIG. 3 is a view of assistance in explaining the ghost phenomenon. It is assumed that yellow patches 32 are formed on the right-hand side of a sheet of paper 31, and a magenta patch 33 is formed at the center thereof. Here, the ghost phenomenon in which a magenta color becomes pale due to deterioration in the adhesion of the toner occurs in portions at a distance of drum pitch (or a distance traveled after one rotation of the photoreceptor drum) from portions in which the yellow patches 32 are formed. Thus, the ghost is a ghost between different colors in which the ghost occurs in different colors rather than in the same color, and the ghost occurs at a location at a distance in terms of time and space, and thus, with correction by image processing, the ghost is difficult to handle. Therefore, in a printing unit, measures may be taken so as to prevent the ghost from occurring.

[Potential Variations Produced by Performing Feeble Light Exposure on Non-Lithographing Area]

Figure 4:
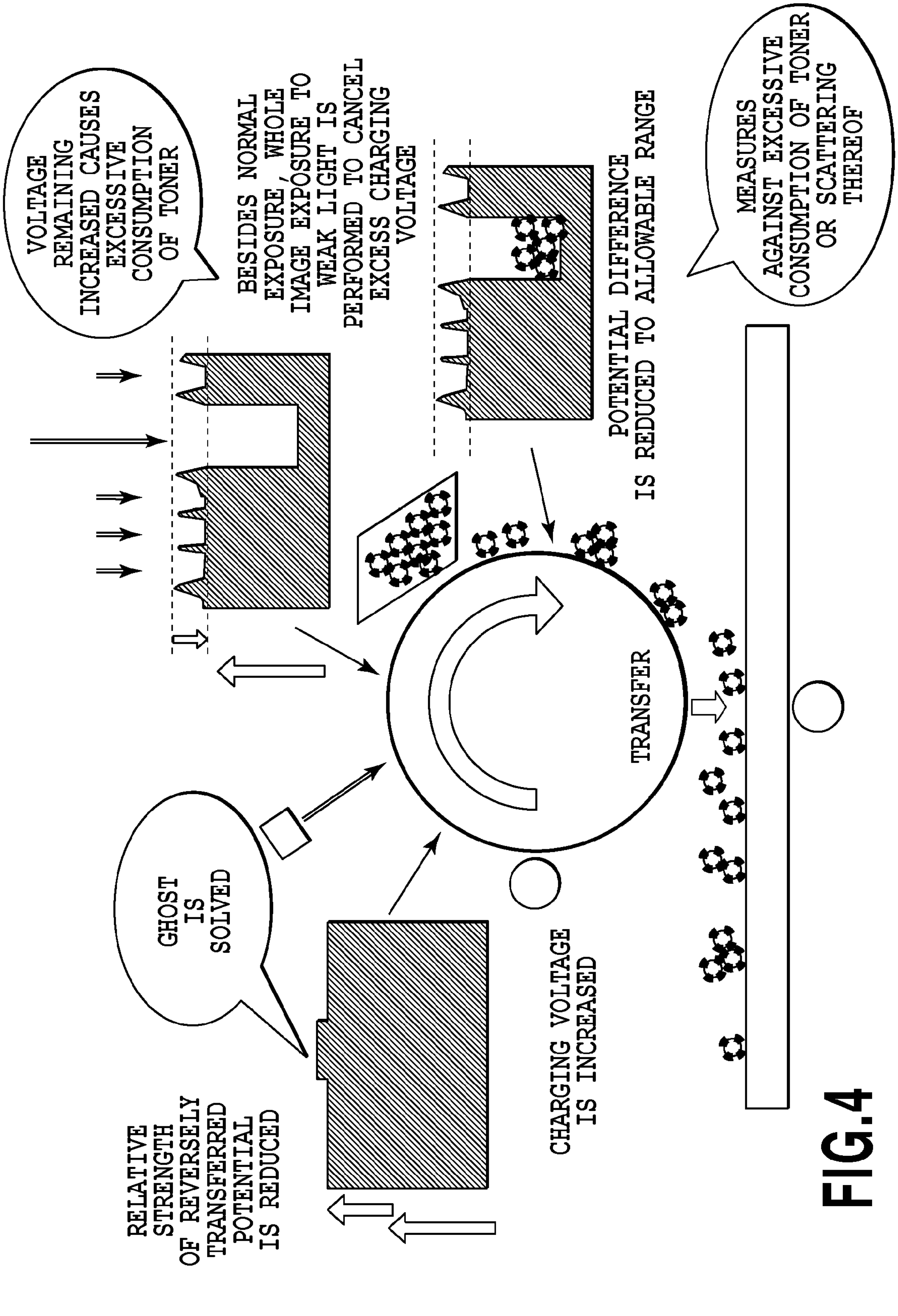
FIG. 4 is a representation illustrating an example of potential variations produced by performing feeble light exposure on a non-rendered area.

FIG. 4 is a representation illustrating an example of potential variations produced by performing feeble light exposure on a non-lithographing area. As illustrated in FIG. 4, first, the charging unit increases a charging voltage, and the lithography unit performs the feeble light exposure on the non-rendered area, thereby enabling image formation with the ghost suppressed. The amount of electric charge which the toner can bear remains constant. Then, in a normally formed toner image, potential strength of the charged image formed by the toner image, from which a reversely transferred image originates, remains constant regardless of a charging potential. Therefore, the charging unit increases the charging potential to be charged into the photoreceptor drum, thereby relatively lessening the influence of the charged image formed by the reversely transferred toner. In other words, a process of increasing the charging potential suppresses the ghost between different colors.

However, the increased charging potential causes another problem.

As previously mentioned, the amount of electric charge which the toner can bear remains constant, and, in the developing unit in which the charging potential is too high, the potential is high and correspondingly leads to an excessive supply of the toner to an optically lithographed latent image. The excessive supply of the toner causes a drawn line to become heavier than that in the rendering image or irregularly extend out beyond a latent image area, which in turn becomes a factor that causes tailing or scattering. Thus, there is not only a very undesirable result in respect of the image, but also an excessive amount of toner consumed.

Therefore, a process for correcting the increased charging voltage may be performed. Specifically, in order to correct the charging voltage, feeble light exposure is performed also on the non-rendered area thereby to cancel an excess charging voltage. Subsequent to the charging unit, the lithography unit performs processing. A general lithography unit performs control so as to emit light onto a rendered area and emit no light onto the non-rendered area. This is replaced by control such that strong light is emitted onto the rendered area and feeble light is emitted onto the non-rendered area. A weak current flows through a photoreceptor portion which receives the feeble light, and there, some of electric charges become lost, but the potential remains. A strong current flows through a photoreceptor portion which receives the strong emitted light, and there, electric charges become lost, and the potential vanishes. Thus, a general electrophotographic image can be reproduced by performing an adjustment so that the potential of the photoreceptor portion which receives the feeble light becomes equivalent to a potential for general lithography. Therefore, the lithography unit may change light emission control to subject the non-rendered area to whole image exposure to weak light and thereby adjust the charging potential, in order to reduce the excessively high charging potential.

Figure 5:
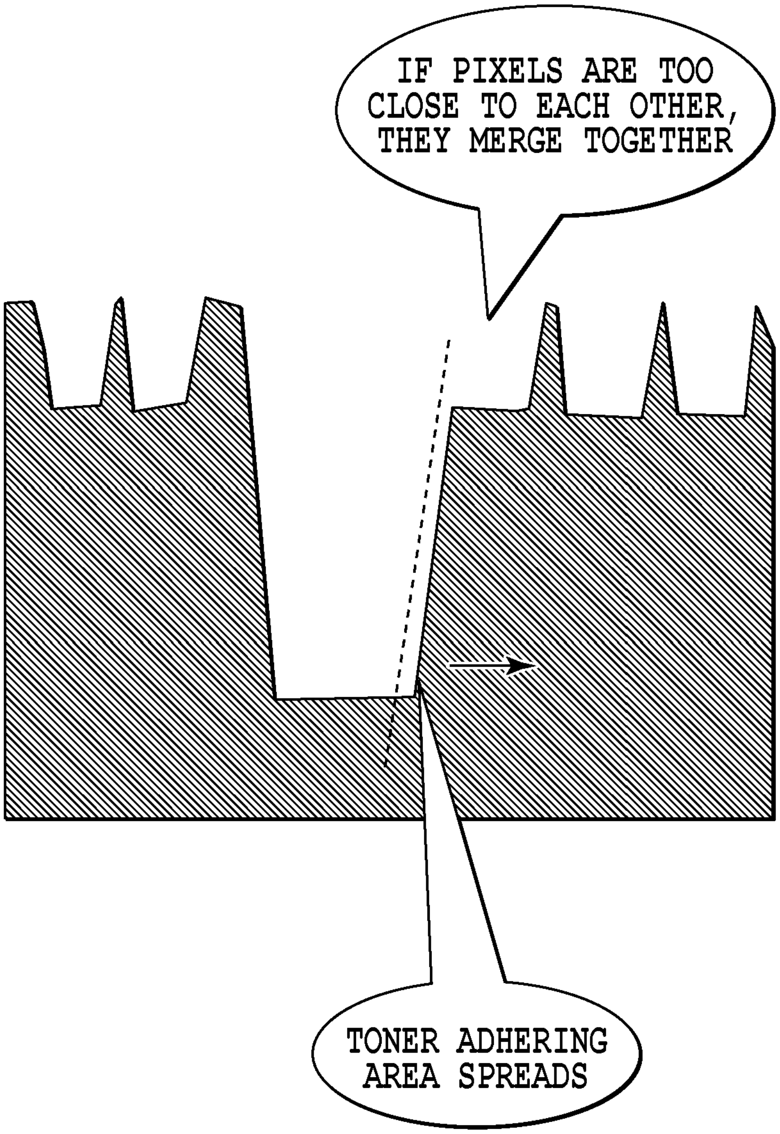
FIG. 5 is a representation illustrating the merging together of pixels caused by exposures performed on a lithographing area and the non-lithographing area.

However, a problem arises with mere control such that the rendered area is subjected to strong light emission and the non-rendered area is subjected to feeble light emission. Generally, the lithography unit is constructed of a laser. In a case of the laser, light emission time is controlled by performing control so as to keep the amount of light emission constant. A laser beam has the property of spreading in the form of Gaussian distribution, and, in a case where a lithographed pixel is in close proximity to a feeble light-exposed pixel, the spreading of a laser beam spot causes the pixels to merge together, thus slightly spreading the charged image. FIG. 5 is a schematic representation illustrating the merging together of the pixels caused by exposures performed on the rendered area and the non-rendered area. FIG. 5 schematically illustrates adhesion of the toner also to an unintended area, or equivalently, the non-rendered area in close proximity to the rendered area. Thus, the merging together of the pixels caused by the exposures performed on the rendered area and the non-rendered area leads to a minuscule increase in the amount of toner adhesion and hence to variations in density.

A pixel of the rendered area may become slightly heavy due to such density variations. Also, in a case where an exposure pattern for the feeble light exposure on the non-rendered area is a periodic pattern, the density variations occur periodically and become noticeable. Further, generally, periodic halftone processing is also performed on the rendered area, and interference may occur between the period of the halftone and the period of the feeble light exposure and hence become a factor that causes image quality degradation such as moiré.

Figure 6:
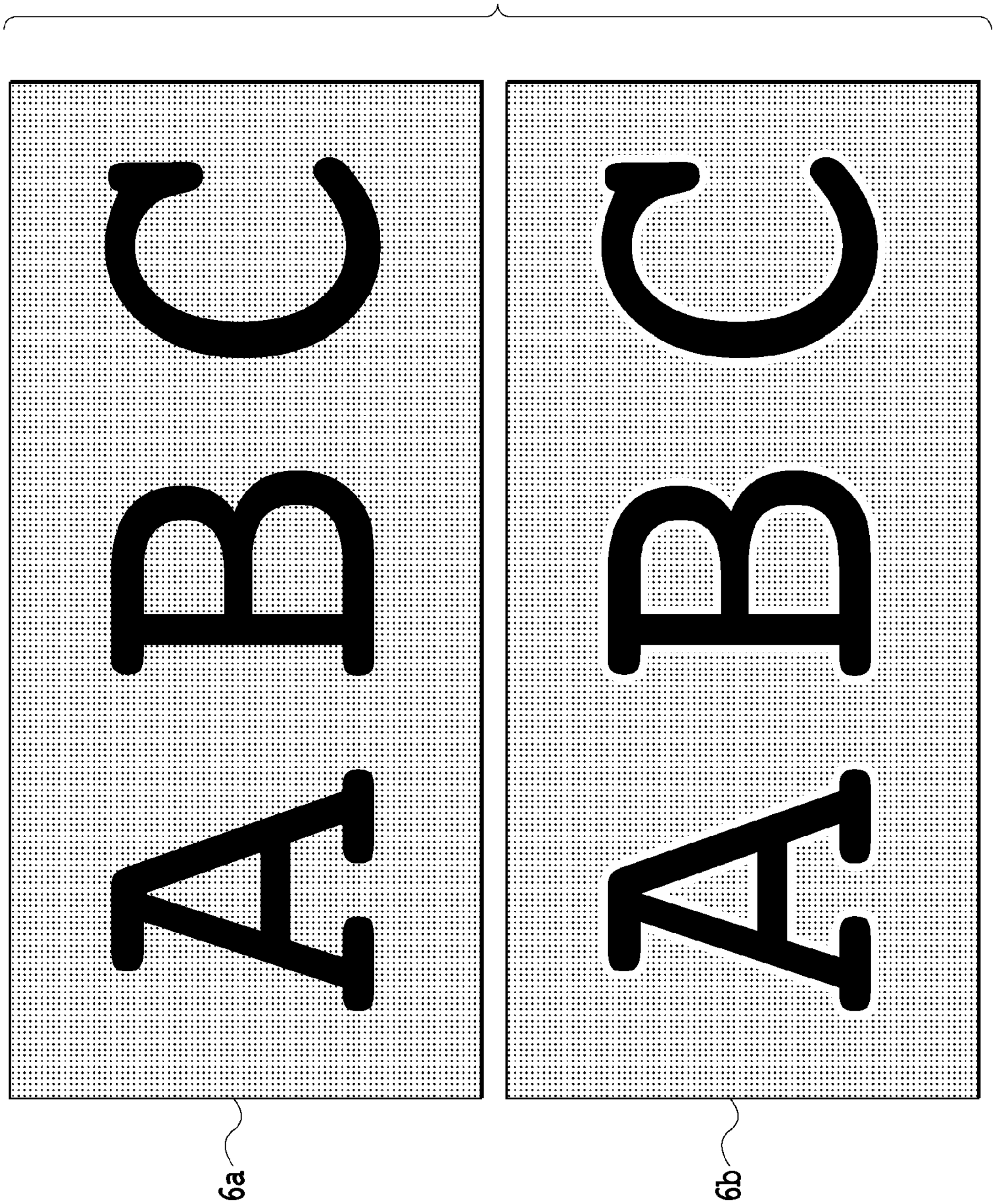
FIG. 6 is a representation of assistance in explaining an advantageous effect of an embodiment.

In the embodiments, therefore, for processing of the rendered area and an area in the neighborhood of the rendered area, control is performed so that the lithography unit emits strong light onto the rendered area and the neighborhood area and emits weak light onto the other areas. In other words, the feeble light exposure is not performed on the area in the neighborhood of the rendered area, even if the area is the non-rendered area. Such control enables avoiding the above-mentioned density variations or moiré or the like. FIG. 6 is a representation of assistance in explaining an advantageous effect of the embodiment. 6*a* indicates an example of a case where control is performed so that the rendered area is subjected to strong light emission and the non-rendered area is subjected to feeble light emission. A dotted area represents an area where the feeble light exposure is performed. In the example indicated by 6*a*, the feeble light exposure is performed also on the non-rendered area in close proximity to the rendered area, and thus, the density variations are noticeable. Meanwhile, in an example indicated by 6*b*, the feeble light exposure is not performed on the non-rendered area in close proximity to the rendered area, and thus, the density variations are less noticeable than those indicated by 6*a*.

Incidentally, description has been given above taking an instance where a laser diode is used as a light source; however, an equivalent technique may be applied to a printing unit which performs optical lithography using an LED (light emitting diode) array or the like, although individual light sources are different in light distribution form.

The specific embodiments will be described below based on the above outlines.

First Embodiment

Figure 7:
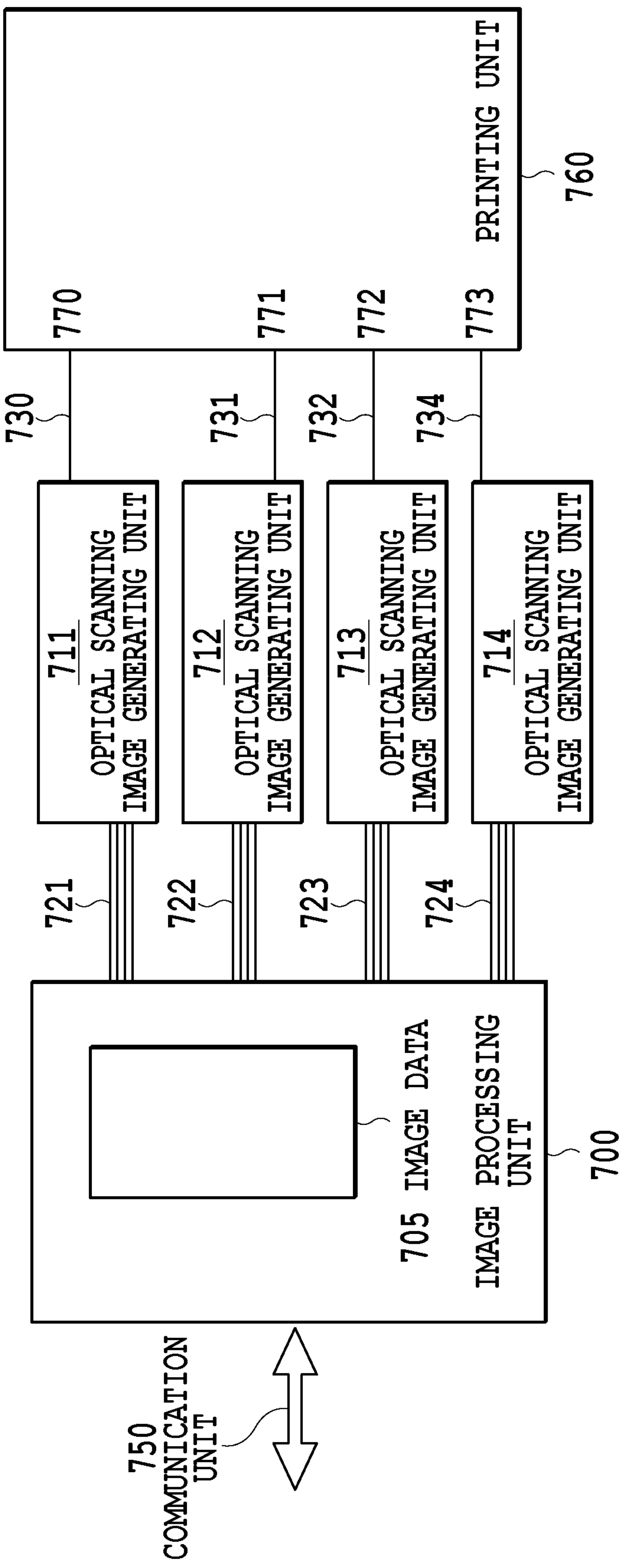
FIG. 7 is a block diagram illustrating an example of a configuration of the image forming apparatus.

FIG. 7 is a block diagram illustrating an example of a configuration of an image forming apparatus according to the embodiment. The image forming apparatus includes an image processing unit 700, a communication unit 750, optical scanning image generating units 711 to 714, and a printing unit 760.

The image forming apparatus receives a command to render or image information by communicating with an external device, and generates image data suitable for actuation of the printing unit and prints an image by the printing unit 760. The communication unit 750 receives the command to render or the image information from the external device. The image processing unit 700 includes a fixed storage, a processing unit, a temporary storage, and the like, as structural elements, in the same manner as a general computer. The image processing unit 700 performs analysis processing on the information received from the communication unit 750 and generates image data 705 suitable for actuation of an electrophotographic developing unit.

In the embodiment, the following description will be given assuming that the image data generated by the image processing unit is multi-valued and is 4 bits of hexadecimal data; however, the image data may be 1 bit of binary data. The multi-valued image data is outputted for each of colors through four transmission lines 721 to 724, and is transmitted via the optical scanning image generating units 711 to 714 to the printing unit 760 and is printed there.

The printing unit 760 includes a charging unit, a lithography unit, a developing unit, a transfer unit, a photoreceptor drum, and the like, for each color. Outputs from the four optical scanning image generating units 711 to 714 actuate light sources of the printing unit 760, for the colors, respectively, thereby to perform feeble light exposure for potential correction or latent image lithographing by switching between them. Further, the printing unit 760 generates a toner image from a latent image and finally produces a printed output on recording paper.

Figure 8:
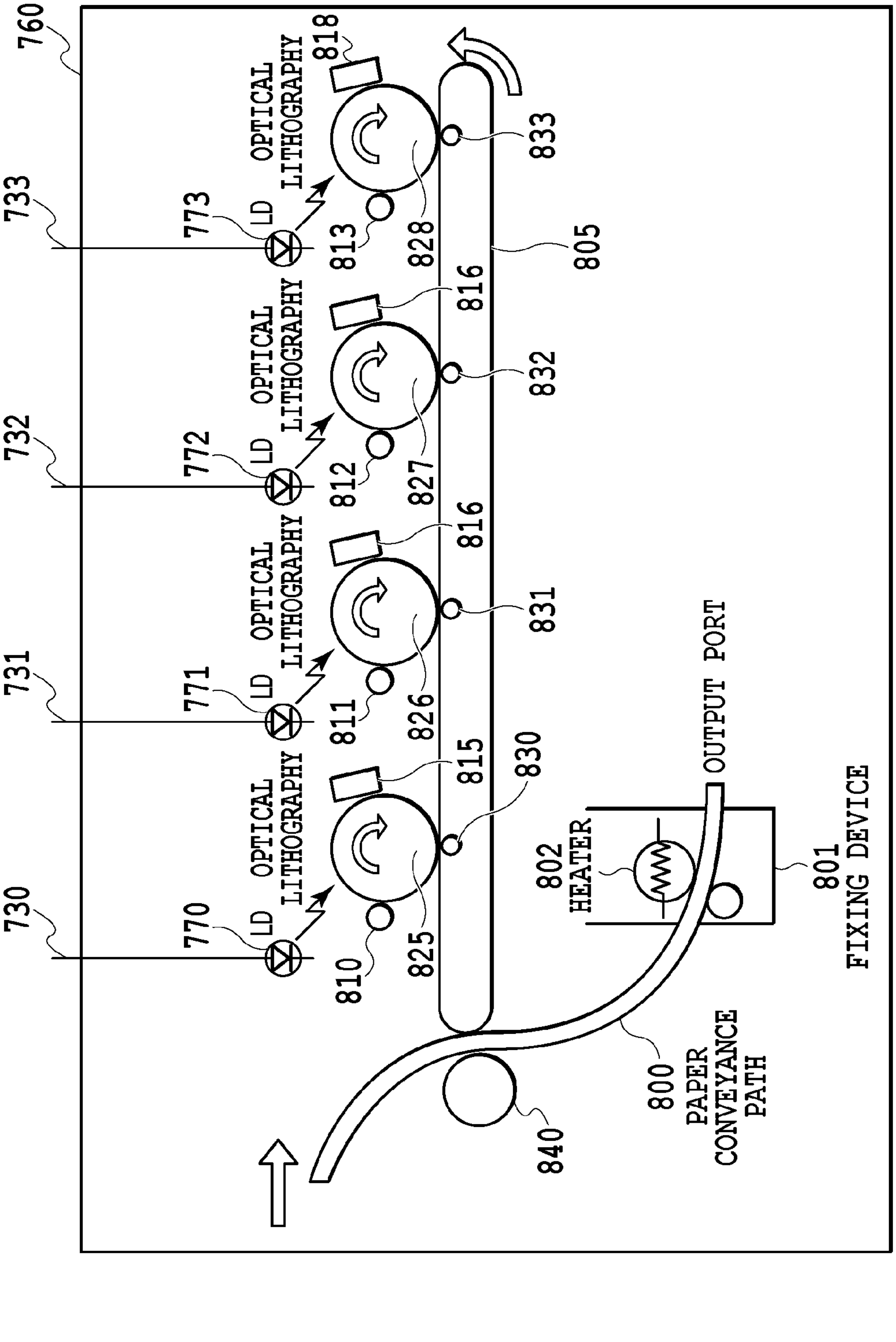
FIG. 8 is a diagram illustrating an example of a configuration of a printing unit.

FIG. 8 is a diagram illustrating an example of a principal configuration of the printing unit 760. Although color reproduction can be said to be theoretically possible with three kinds of pigments, reproduction of light absorption characteristics of a black color is difficult with a mixture of three colors of pigments, and thus, black pigment is typically added to use four kinds of pigments for color printing. Therefore, the printing unit 760 of FIG. 8 is provided with the photoreceptor drum, the lithography unit, the developing unit, and the like, for each color, and the images of the colors are combined together on a transfer belt or the like and are printed on paper.

In the example of FIG. 8, the configuration having four developing systems is illustrated; however, in a case where it is desired to improve reproducibility of a special color, or in a case where white, metallic color, or the like, the reproduction of which is difficult with a combination of three colors is included, five or more developing systems may be provided. Alternatively, a three-color configuration with black omitted may also be adopted, and the configuration is not limited to the example of FIG. 8. In the embodiment, an example of a configuration of the printing unit having an arrangement of four printing units is given as a configuration which is inexpensive and maintains productivity.

The printing units are constructed of charging units 810 to 813, lithography units 770 to 773, developing units 815 to

818, transfer units 830 to 833, photoreceptor drums 825 to 828, and the like, respectively.

The developing units 815 to 818 serve to develop the colors, respectively, and toner images of four colors are combined together on a transfer belt 805. In other words, the transfer units 830 to 833 of the printing units primarily transfer the toner images developed in the colors from the photoreceptor drums 825 to 828 onto the transfer belt 805. The toner images of the colors are combined together on the transfer belt 805 and are secondarily transferred to paper (unillustrated) by a secondary transfer unit 840. Then, the paper is conveyed to a fixing device 801 through a paper conveyance path 800. The fixing device 801 fixes the toner images on the paper by heat and pressure to produce a color printed output. The fixing device 801 fixes the toner images temporarily fixed on a paper surface by electric charge, on the paper by the heat and the pressure. A heater 802 of the fixing device temporarily heats and melts a toner resin to assist in the fixing and fusing of the toner resin to the paper.

The toner images are formed on the photoreceptor drums 825 to 828 by the following procedure. The charging units 810 to 813 charge the surfaces of the photoreceptor drums 825 to 828, respectively, thereby to increase an electric potential. In the embodiment, the photoreceptor drums are charged with a higher potential than an electric potential required to make a typical toner latent image. Thereby, the ghost phenomenon previously mentioned is suppressed. Then, the lithography units 770 to 773 perform optical lithography to cause some of surface charges to vanish, thereby to make potential latent images. In the embodiment, laser light sources are used as the lithography units.

In a case of formation of a two-dimensional latent image by the optical lithography, any of the following methods may be used; specifically, the methods include a method in which a column of light sources is arranged in a column, and a method in which one or a few light sources and rotary polygon mirrors are used in combination to perform vertical scanning in a direction of conveyance. In the embodiment, a method in which one light source is provided for each color is used. The lithography units 770 to 773 having the laser light sources scan over the photoreceptor drums 825 to 828, respectively, by optical scanning systems. On light-exposed portions of the photoreceptor drums, electric charges become lost to thus form the potential latent images.

Incidentally, the intensity of scanning light is determined by the optical scanning image generating units 711 to 714 illustrated in FIG. 7. In the embodiment, the intensity of the scanning light is switched between the rendered area and its neighborhood and the other areas. The other areas are exposed to the scanning light of intensity determined by the feeble light exposure pattern. In an area where the feeble light exposure pattern is lithographed, some of electric charges become lost, but an electric potential remains. In a lithographed area in a region judged as the rendered area and its neighborhood, electric charges on the surface of the photoreceptor drum become lost and an electric potential vanishes.

The developing units 815 to 818 develop the latent images thus lithographed on the photoreceptor drums 825 to 828, respectively. Specifically, the developing units 815 to 818 charge the toner as resin flakes containing the pigments with an electric charge in the same direction as that of a surface potential of the photoreceptors, thereby to supply the toner onto the photoreceptor drums. The toner supplied onto the photoreceptors avoids the areas where the electric potential remains, and the toner adheres to the portions in which the electric charges have vanished completely by the optical lithography. As a result, the latent images optically lithographed on the photoreceptors are converted into the toner images.

The toner images developed on the photoreceptor drums are sequentially transferred from the photoreceptor drums 825 to 828 to the transfer belt 805, and the toner moves from the surfaces of the photoreceptors to the surface of the transfer belt.

Figure 9:
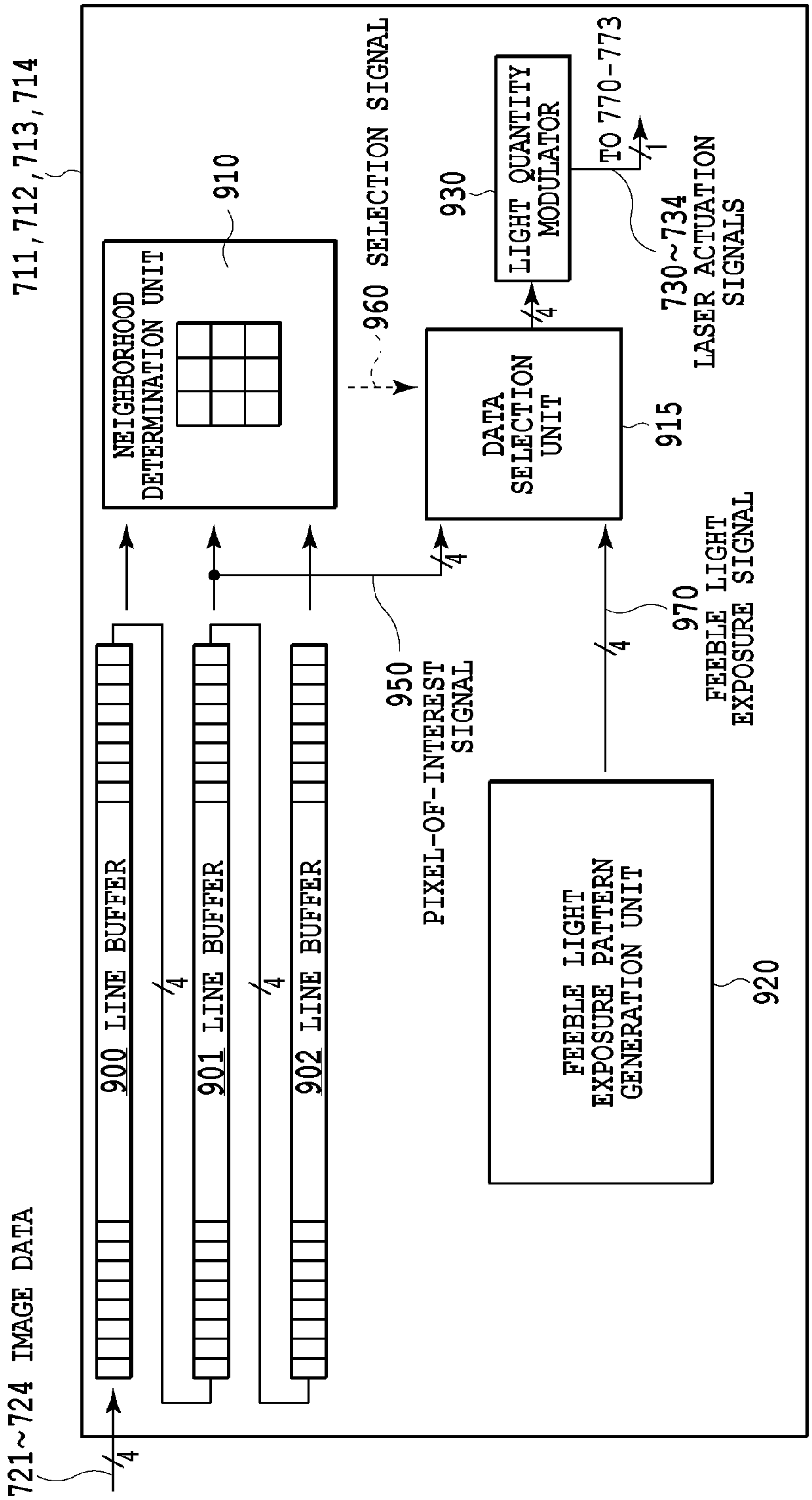
FIG. 9 is a block diagram illustrating an example of an optical scanning image generating unit.

Next, the optical scanning image generating unit will be described by using FIG. 9. FIG. 9 is a block diagram illustrating an example of the optical scanning image generating unit. A principal configuration of each of the optical scanning image generating units 711 to 714 includes a feeble light exposure pattern generation unit 920, a neighborhood determination unit 910, and a data selection unit 915 to select either a feeble light exposure pattern or image data. Also, the optical scanning image generating units 711 to 714 each include line buffers 900 to 902.

The neighborhood determination unit 910 determines whether or not a pixel of interest is in any of a rendering area and its neighborhood. The rendering area is determined based on image data from the image processing unit 700. The “neighborhood” of the rendering area can be determined by a spot size of a laser used by the printing unit. Alternatively, the “neighborhood” of the rendering area may also be determined as a predetermined number of pixels around a rendering pixel. In the embodiment, a 3×3 filter which determines 8 pixels in the neighborhood of the pixel of interest is used as an example of a simple approach for determining the neighborhood.

Incidentally, in the embodiment, a pixel of image data is set to 4 bits of hexadecimal data. The larger numeric value of 4 bits of data indicates stronger light for optical lithography, and the value equal to 0 indicates a non-rendering pixel.

In a case where the pixel of interest is in the center of the 3×3 filter, if the pixel values of all pixels are null, the neighborhood determination unit 910 can determine that the pixel of interest is neither in the rendering area nor in the neighborhood of the rendering area. Meanwhile, if the pixel of interest in the 3×3 filter has a pixel value, the neighborhood determination unit 910 can determine that the pixel of interest is in the rendering area. Also, if the pixel of interest in the 3×3 filter has no pixel value and a portion other than the pixel of interest has a pixel value, the neighborhood determination unit 910 can determine that the pixel of interest is in the neighborhood of the rendering area. The neighborhood determination unit 910 outputs a result of determination of the pixel of interest, as a selection signal 960, to the data selection unit 915. The selection signal 960 is a signal to select either the use of the image data or the use of the feeble light exposure pattern as a laser actuation signal. In the embodiment, in addition to a case where the pixel of interest is in the rendering area, also in a case where the pixel of interest is in the neighborhood of the rendering area, a signal to select the use of the image data is outputted. Then, in a case where the pixel of interest is neither in the rendering area nor in the neighborhood of the rendering area, a signal to select the use of the feeble light exposure pattern is outputted. Such processing enables avoiding the density variations, the image quality degradation, or the like. Details will be described later.

Incidentally, in a case where the 3×3 filter is thus used to determine the pixel of interest, information on pixels in a vertical direction of the pixel of interest is necessary. In the example of FIG. 9, the three line buffers 900 to 902 are provided. In a case where a unit to refer only to the neighborhood of 3×3 pixels is configured, three scan lines in total, specifically, a line which is currently in process of optical scanning, and, besides, a pre-scan line and a post-scan line, are used. Each of the line buffers stores the pixel values of a column of pixels for a scan, and shifts the pixel values, pixel by pixel, in synchronization with a pixel clock, to perform processing. The line buffer 901 is coupled to a stage following the line buffer 900, and further, the line buffer 902 is coupled to a stage following the line buffer 901.

The line buffer 900 holds the pixel values of a column of pixels for a column of image data, as pre-scan information which is not yet used for the optical lithography. The line buffer 901 holds the pixel values of a column of pixels for a column of image data containing the pixel of interest which is currently in process of being used for the optical lithography. The line buffer 902 holds the pixel values of a column of pixels for a column of image data, as post-scan information which has already been used for the optical lithography. The pixel values of the pixel of interest and its neighboring pixel are extracted from each line buffer in process of scanning and are inputted to the neighborhood determination unit 910. Incidentally, in the embodiment, the three line buffers are provided and the 3×3 filter is used to determine the neighborhood; however, an approach for determining the neighborhood is not limited to this example. For example, five line buffers may be provided to implement a 5×5 filter, or a filter having a filter size increased in a direction of horizontal scanning, such as a 5×3 or 7×3 filter, may be used.

The feeble light exposure pattern generation unit 920 holds the feeble light exposure pattern to fill up a non-rendering area which is not the rendering area or its neighborhood area, in image data. The feeble light exposure pattern generation unit 920 obtains timing information for image data scanning, and generates and outputs a signal according to the feeble light exposure pattern in synchronization with image data rendering.

In the embodiment, description will be given with regard to an example in which a periodic pattern is used as the feeble light exposure pattern. Brief description will be given with regard to the reason for using the periodic pattern. As previously described, the lithography unit performs the optical lithography using the laser beam. The laser beam has the property of spreading in the form of Gaussian distribution. Depending on resolution or characteristics of the laser, the spreading of the laser beam is advantageous in the feeble light exposure although making it difficult to strictly adjust the amount of light for each pixel. Specifically, discrete light emissions are provided at intervals of several pixels, and thereby, feeble light exposures merge together to uniformly irradiate the photoreceptor surface with light and thus enable a uniform reduction in electric potential. Also, the discrete light emissions at intervals of several pixels are advantageous in terms of electromagnetic wave noise or longevity of the light source.

In the embodiment, the periodic pattern is used as an arrangement of pixels for the discrete light emissions, or equivalently, the feeble light exposure pattern. Using the periodic pattern facilitates controlling the uniform reduction in the electric potential. Incidentally, in a case where measures such as the embodiment are not taken, the use of the periodic pattern may cause interference with the period of the halftone processing of a rendered image and hence cause moiré or the like. In the embodiment, however, control is performed so as not to perform the feeble light exposure on the rendering area and its neighborhood, and thus, such an occurrence of moiré or the like can be prevented. The above is the reason why the periodic pattern is used as the feeble light exposure pattern.

The feeble light exposure pattern generation unit 920 counts the pixel clocks or synchronization signals for the scan lines, as the timing information, thereby to synchronize the periodic pattern. The feeble light exposure pattern generation unit 920 uses information on a light intensity pattern set in a numeric value table, for example, as the periodic pattern.

Table 1 illustrates the light intensity pattern as an example of the numeric value table.

TABLE 1

| | | | | |
|---|---|---|---|---|
| 0 | 0 | 1 | 0 | 2 |
| 0 | 2 | 0 | 0 | 0 |
| 1 | 0 | 0 | 2 | 0 |

In the example of Table 1, a pixel having the value “0” undergoes no light emission, and pixels having the values “1” and “2” undergo feeble light exposures corresponding to the values, respectively. Among light intensities capable of actuation, weak light intensity is used as the intensity of light emission for the feeble light exposure. The combined use of plural light intensities facilitates fine adjustment of the amount of light for the potential correction. In a case where PWM (pulse width modulation) is used to adjust the amount of light, the laser is actuated at high frequency, and thus, a device is prone to produce a prescribed or higher level of electromagnetic wave noise. A harmonic component distribution of a pulse is known to vary according to the pulse width, and thus, different pulse widths are mixed together to form the feeble light exposure pattern, and thereby, the electromagnetic wave noise is less likely to converge at a specified frequency. In the embodiment, therefore, an example is given in which the plural light intensities are used.

Table 1 illustrates the feeble light exposure pattern having five pixels in the direction of horizontal scanning and three pixels in a direction of vertical scanning. A feeble light exposure signal 970 for a pixel as the sixth pixel in the direction of horizontal scanning and the fourth pixel in the direction of vertical scanning has the value (i.e. 0) of a pixel as the first pixel in the direction of horizontal scanning and the first pixel in the direction of vertical scanning in the periodic pattern. As expressed in equation form, the feeble light exposure signal 970 for a pixel as the Nth pixel in the direction of horizontal scanning and the Mth pixel in the direction of vertical scanning has the value of a pixel as the N mod 5th pixel and the M mod 3rd pixel in the periodic pattern.

Of course, it is needless to say that a pattern other than Table 1 may be used. In this case, the number of pixels in the direction of horizontal scanning and the number of pixels in the direction of vertical scanning in the used pattern are used in place of “5” and “3” in “N mod 5” and “M mod 3.” Also, although it goes without saying that the feeble light exposure pattern may contain a value such as “15,” its maximum value is not limited to “2” but may be set to the value “3” or “4.” In other words, the value “1” or “2” may be set by a designer for the apparatus, as appropriate.

The data selection unit 915 selects either a pixel-of-interest signal 950 or the feeble light exposure signal 970 from the feeble light exposure pattern generation unit 920, for each pixel, based on the selection signal 960, thereby to determine the intensity of the light source for actuation. Under control of the selection signal 960, a signal for the image data, namely, the pixel-of-interest signal 950, is selected for the rendering pixel and the neighborhood of the rendering pixel in the image data. Meanwhile, the feeble light exposure signal 970 is selected for the non-rendering area far away from the rendering pixel. A pixel in itself which is in the neighborhood of the rendering pixel and is in the non-rendering area has a density of 0, and thus, as a result, the periphery of the rendering pixel is edged with non-lithographed pixels which undergo no feeble light exposure. Then, an area other than the rendering pixel and the neighborhood of the rendering pixel is filled with the feeble light exposure pattern.

Figure 10:
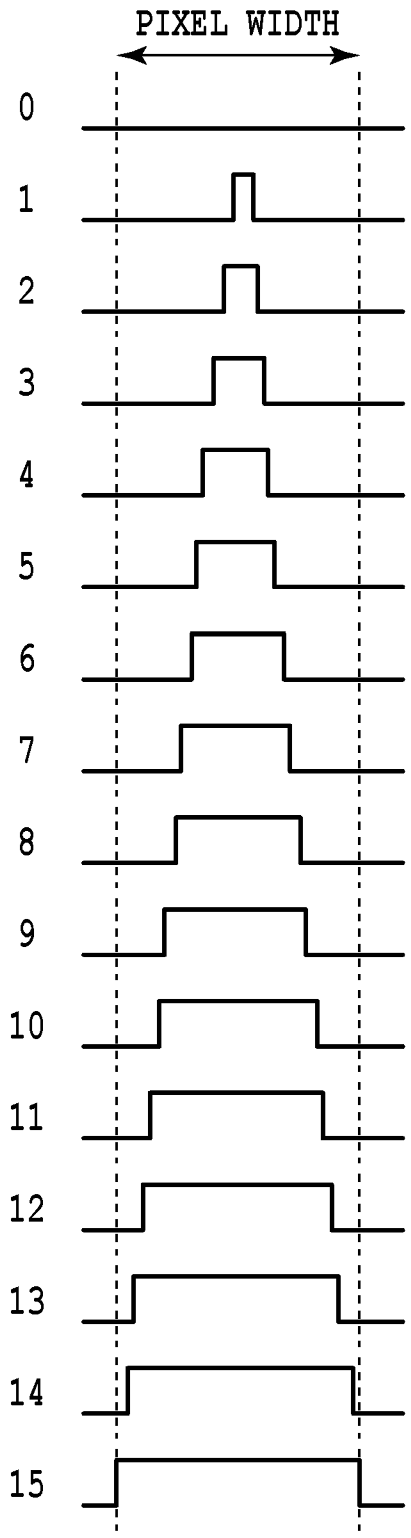
FIG. 10 is a chart illustrating an example of a PWM waveform.

An actuation intensity command signal from the data selection unit 915 is inputted to a light quantity modulator 930. In a case where a semiconductor laser is used as the light source, direct control of the amount of light emission in itself is difficult, and thus, the amount of light is indirectly controlled by controlling the light emission time. In other words, pulse width modulation (PWM) is performed. FIG. 10 illustrates inputs to the light quantity modulator and pulse width modulated output waveforms. The smaller the numeric value, the shorter the turn-on time; meanwhile, the larger the numeric value, the longer the turn-on time. The value “0” indicates a “no light emission” condition and the turn-on time is zero, and the value “15” indicates a “full turn-on” condition and the turn-on time alone is set. In a case where the light emission time per pixel is set to 100 nsec, the laser actuation signal operates for 100 nsec if the input value of 4 bits of data is the maximum value “15,” the laser actuation signal operates for a little more than 50 nsec if the input value is the value “8,” or the laser actuation signal operates for 6 to 7 nsec if the input value is the value “1.” Although the output from the light quantity modulator 930 is a binary signal as a voltage level, PWM processing is performed to modulate actuation time in a direction of time axis and thereby control the light intensity.

Figure 11:
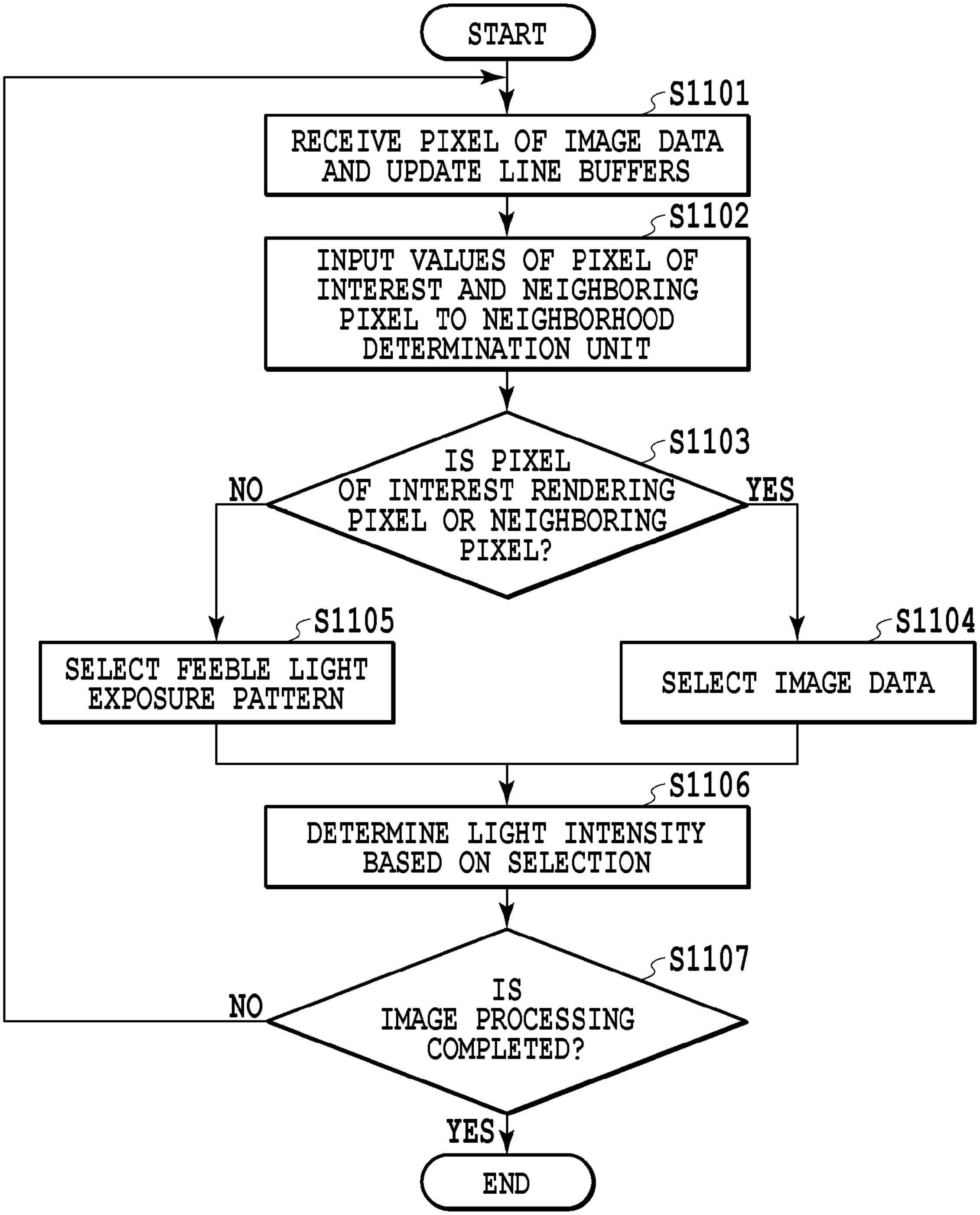
FIG. 11 is a flowchart illustrating an example of processing performed by the optical scanning image generating unit.

FIG. 11 is a flowchart illustrating an example of processing performed by the optical scanning image generating unit according to the embodiment. Although the processing illustrated in FIG. 11 is implemented in a hardware configuration illustrated in FIG. 9, the processing may be implemented by software-based processing, such as by a processor such as a CPU (central processing unit) (unillustrated) executing a program stored in a ROM (read only memory) (unillustrated).

At step S1101, the optical scanning image generating unit receives a pixel of image data from the image processing unit. At step S1101, the optical scanning image generating unit shifts the pixel values buffered in the line buffers, pixel by pixel, thereby to update the line buffers 900 to 902.

At step S1102, the optical scanning image generating unit inputs a pixel of interest and a pixel in the neighborhood of the pixel of interest to the neighborhood determination unit 910. In the embodiment, 3×3 pixels with the pixel of interest in the center are inputted.

At step S1103, the optical scanning image generating unit determines the neighborhood. Specifically, the optical scanning image generating unit determines whether or not the pixel of interest is any of a rendering pixel and its neighboring pixel. If a result of step S1103 shows that the pixel of interest is the rendering pixel or its neighboring pixel, the optical scanning image generating unit causes the processing to go to step S1104. If the result of step S1103 shows that the pixel of interest is neither the rendering pixel nor its neighboring pixel, the optical scanning image generating unit causes the processing to go to step S1105.

At step S1104, the optical scanning image generating unit selects the use of the image data to output the pixel of interest.

At step S1105, the optical scanning image generating unit selects the use of the feeble light exposure pattern to output the pixel of interest.

At step S1106, the optical scanning image generating unit determines light intensity for lithographing the pixel of interest, based on a selection made at step S1104 or step S1105. At step S1107, the optical scanning image generating unit determines whether all pixels in an image have been processed as the pixel of interest, and, if an unprocessed pixel is present, the processing starting at step S1101 is repeated.

According to the embodiment, as described above, it is possible to achieve image formation which suppresses the ghost phenomenon and avoids the occurrence of the density variations or the like. Also, the advantageous effect of the embodiment is as indicated by the example of FIG. 6 given previously.

Incidentally, as described with reference to the example of FIG. 2, the embodiment solves the problems which may be primarily or secondarily caused by the toner image on the upstream side affecting the photoreceptor drum on the downstream side via the transfer belt. In other words, in the printing unit on the upstream side, the toner image may not exert its influence via the transfer belt. In the printing unit on the upstream side, therefore, the optical scanning image generating unit is not necessarily limited to having the configuration as described with reference to the embodiment, although the optical scanning image generating unit has been described as being configurable in the same manner for each color. Also on the upstream side, of course, the optical scanning image generating unit may have the configuration as described with reference to the embodiment.

Second Embodiment

In the first embodiment, description has been given with regard to an example in which a single feeble light exposure pattern is used. However, an electrophotographic image forming apparatus includes various consumables as structural elements. Although a photoreceptor drum is designed to ensure high durability, the photoreceptor drum is located at a position where hard wear occurs, and thus, the photoreceptor drum is a structural member which undergoes inevitable variations in characteristics such as electrostatic properties or light sensitivity in its product life. In particular, in a case of design such that charging potentials are set high and some of them are reduced again by feeble light exposure, plural settings of electric potential are made and thus lead to a greater influence. Moreover, toner in powder form also varies in characteristics.

In order to maintain stable characteristics, it is necessary to measure variations in the characteristics and correct the amount of light for the feeble light exposure or the charging potential. In the embodiment, therefore, plural feeble light exposure patterns are prepared. Also, logs are kept of the number of times structural members have been used or the longevities of the members, and settings are changed according to the degree of wear such as the number of uses of the members. In the embodiment, a configuration is given in which a log is kept of the number of times the photoreceptor drum has been used and the feeble light exposure pattern is changed for every given number of sheets of paper.

The feeble light exposure pattern generation unit 920 stores the plural feeble light exposure patterns, and uses a counter capable of setting the n-ary number by an internal n-ary counter so that a pattern size is variable.

TABLE 2

| Number of sheets printed by drum | PrnIndex |
|---|---|
| 0 to 4999 | 0 |
| 5000 to 9999 | 1 |
| 10000 to 19999 | 2 |
| 20000 or more | 3 |

TABLE 3

| Settings of feeble light exposure | PatIndex |
|---|---|
| Setting 1 | 0 |
| Setting 2 | 1 |
| Setting 3 | 2 |
| Setting 4 | 3 |

Table 2 illustrates an example in which index numeric values are assigned to the number of times the photoreceptor drum has been used, in the embodiment. Also, Table 3 illustrates an example in which index numeric values are assigned to the settings of the feeble light exposure patterns. The index values correspond to each other; for example, in a case where the number of sheets printed by the drum is 10000 to 19999, a periodic pattern indicated by “setting 3” is used. Thus, the feeble light exposure pattern is appropriately set thereby to enable the feeble light exposure with the amount of light according to the present state of wear and thus enable providing the best print quality.

Third Embodiment

In a third embodiment, description will be given with regard to an example of a preferred arrangement of pixels of the periodic pattern of the feeble light exposure pattern. A light intensity distribution of a laser beam is approximated to be the Gaussian distribution.

A simplified normal distribution function is expressed by Equation (1) in which mean of the Gaussian distribution is defined as zero and variance is defined as 1.

$$Z=1/(\sqrt{(2\pi)})\times\exp(-(x^2+y^2)/2) \quad (1)$$

Although Equation (1) is an exponential function, for use, a distance from a peak center point of ½ of light intensity relative to peak intensity is defined as a spot size thereby to facilitate measurement. A distance about 1.4 times the spot size is necessary in order to reduce the light intensity to ¼ which is half of the spot size. Further, a distance about 1.8 times the spot size is necessary in order to reduce the light intensity to 10%.

The laser beam has such a light intensity distribution, and thus, two beams are brought close to each other in such a manner that a distance between the beams is about 1.7 times the spot size, and thereby, their peaks merge together into one continuous peak. Desirably, individual discrete light emission points of individual feeble light exposures fall within this range from the viewpoint of uniform correction of charging potential, and thus, such design is made.

Figure 12A:
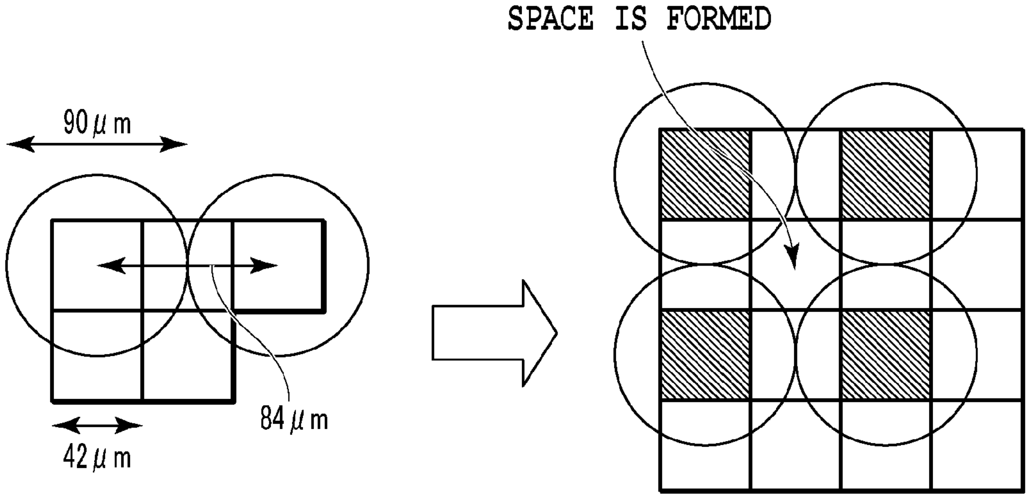
FIGS. 12A and 12B are representations of assistance in explaining examples of arrangements of pixels of periodic patterns.

As an example of numeric values, in a case of a print resolution of 600 dpi, a light quantity half-width diameter of the beam is set to 90 μm. A pixel size of 600 dpi is 42 μm. In a type of equipment in which optical design is made so that the light quantity half-width diameter is 90 μm at the photoreceptor surface, it is necessary that a distance between the points of light fall within about 77 μm in order to keep a corrected potential substantially flat. This value is slightly less than a period of 84 μm between two pixels at 600 dpi, and thus, as illustrated in FIG. 12A, an electric potential between the adjacent points of light is poor in uniformity, and there is an area where no potential correction takes place obliquely.

Figure 12B:
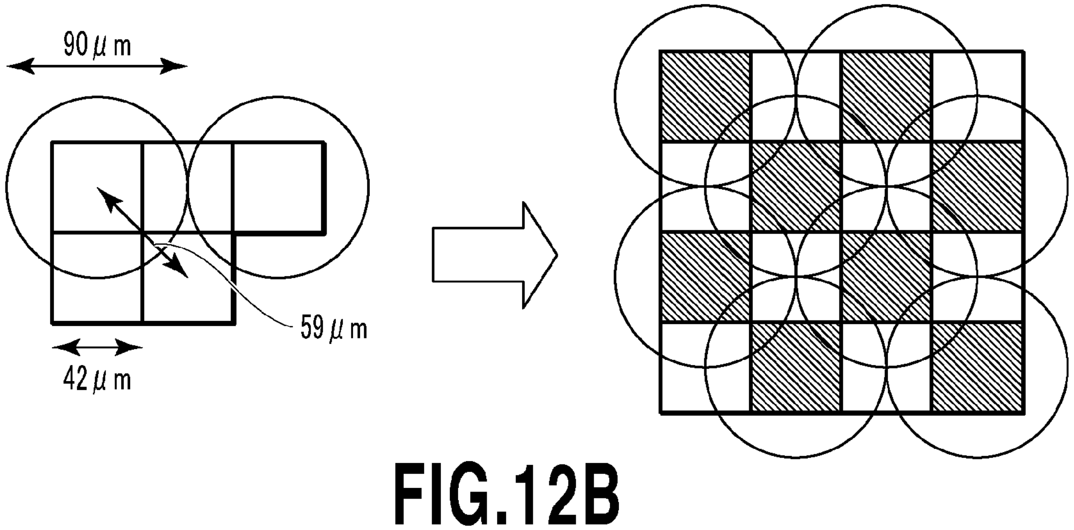

Meanwhile, a distance between pixels obliquely at 45°, as calculated, falls within 59 μm, and thus, it is preferable to use a periodic pattern in which the light emission points of the feeble light exposures are arranged in a checkered pattern, as illustrated in FIG. 12B. As illustrated in FIG. 12B, flatness of a charging potential between the obliquely adjacent points of light can be substantially ensured, and there is no area where no potential correction takes place horizontally and vertically.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-153803, filed Jul. 24, 2013, which is hereby incorporated by reference herein in its entirety.

What is claimed is:

1. An apparatus comprising:

a determination unit configured to determine whether a density of each pixel in image data is equal to or less than a threshold; and an adding unit configured to add a predetermined density to a density of each pixel, wherein, in a case where a determination is made that a density of a pixel of interest is greater than the threshold, or in a case where a pixel having a greater density than the threshold is present in a neighborhood of the pixel of interest at a predetermined distance from the pixel of interest, exposure with intensity corresponding to a density of the pixel of interest to which the predetermined density has not been added is performed on a photoreceptor drum at a position corresponding to the pixel of interest, otherwise, exposure with intensity corresponding to a density of the pixel of interest to which the predetermined density has been added is performed on the photoreceptor drum at the position corresponding to the pixel of interest.

2. The apparatus according to claim 1, wherein the threshold is 0.

3. The apparatus according to claim 1, wherein the apparatus is a printing apparatus capable of printing in cyan (C), magenta (M), yellow (Y) and black (K) colors, and the adding unit performs addition in a case where the image data is image data of any one of three of the four CMYK colors.

4. The apparatus according to claim 3, wherein the image data of the three colors is image data located downstream in a printing engine.

5. A method comprising:

a determination step of determining whether a density of each pixel in image data is equal to or less than a threshold;

an adding step of adding a predetermined density to the density of each pixel;

a step of performing exposure with intensity corresponding to ta density of a pixel of interest to which the predetermined density has not been added, on a photoreceptor drum at a position corresponding to the pixel of interest, in a case where a determination is made that the density of the pixel of interest is greater than the threshold, or in a case where a pixel having a greater density than the threshold is present in a neighborhood of the pixel of interest at a predetermined distance from the pixel of interest; and a step of, otherwise, performing exposure with intensity corresponding to a density of the pixel of interest to which the predetermined density has been added, on the photoreceptor drum at the position corresponding to the pixel of interest.

6. The method according to claim 5, wherein the threshold is 0.

7. The method according to claim 5, wherein the method is a printing method capable of printing in cyan (C), magenta (M), yellow (Y) and black (K) colors, and the adding step performs addition in a case where the image data is image data of any one of three of the four CMYK colors.

8. The method according to claim 7, wherein the image data of the three colors is image data located downstream in a printing engine.

* * * * *